July 6, 1954

H. P. SMITH ET AL 2,682,818

TWO-WAY PLOW

Filed March 17, 1952

Inventors:
Hiram P. Smith
Howell N. James
Paul O. Pip*** Atty.

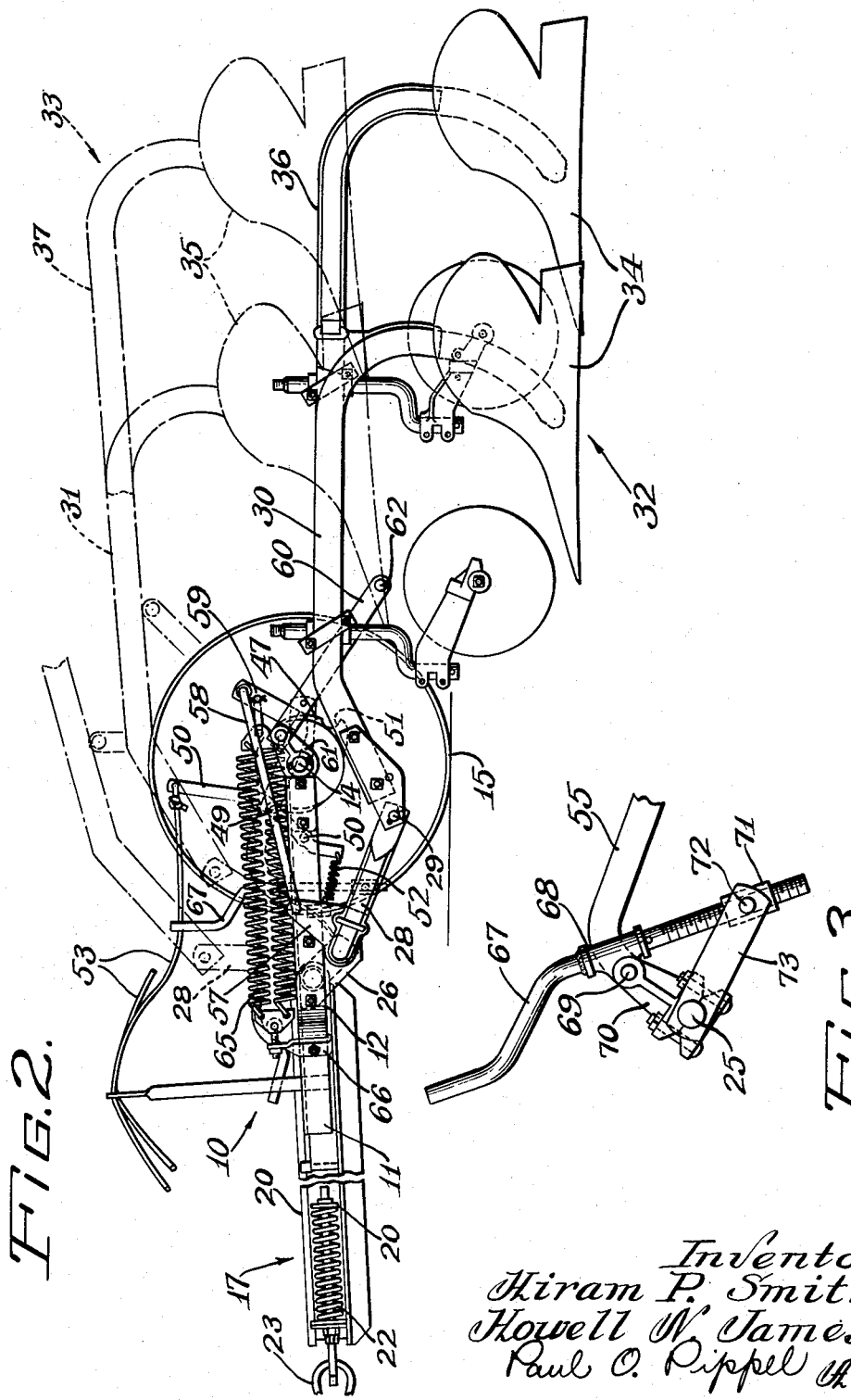

Patented July 6, 1954

2,682,818

UNITED STATES PATENT OFFICE 2,682,818

TWO-WAY PLOW

Hiram P. Smith, La Grange, Ill., and Howell N. James, Doncaster, England, assignors to International Harvester Company, a corporation of New Jersey Application March 17, 1952, Serial No. 277,026

8 Claims. (Cl. 97—29)

This invention relates to agricultural implements and particularly to plows. More specifically the invention concerns a two-way plow of the trailing type.

Alternating or two-way plows, such as that with which this invention is concerned, involve the use of a pair of plowing units adapted to be placed alternately in operation in traveling back and forth across a field so that the earth may always be turned in the same direction, one set of plow bottoms being arranged for right-hand plowing and the other for left-hand plowing. In the type of two-way plow with which this invention is particularly concerned, the right and left-hand plowing units are laterally spaced and are separately or independently vertically moved to and from operating position. The plowing units are mounted upon a wheeled frame by which the operation of the plow bottoms is gauged and the frame attached to a tractive vehicle to be propelled thereby. One serious disadvantage in previous alternating plows of this type has been the difficulty of securing sufficient elevation of the inoperative plowing unit in its raised or transport position. Another obstacle has been the inability, by virtue of its mounting, of the operating unit to maintain proper working depth in different kinds of soil.

The present invention overcomes the foregoing obstacles and others, and has for its object the provision of an improved two-way plow and means for securing adequate elevation for the plowing units in their transport or in operative positions.

Another object of the invention is the provision of a two-way plow wherein improved means are provided for mounting the plowing units upon a support.

Another object of the invention is the provision in a two-way plow of improved means for lifting the units to an inoperative position.

A further object of the invention is the provision of a two-way plow having improved means for securing constant elevation of the inoperative unit irrespective of the variation in operating depth thereof.

Other objects and advantages of the invention will become clear from the following detailed description when read in conjunction with the accompanying drawings, wherein:

Fig. 2 is a view in side elevation of the plow shown in Fig. 1 with the operating position of the appropriate plowing unit shown in solid lines and the elevated position of the other unit being indicated in dotted lines.

Fig. 3 is an enlarged detail of the depth-regulating mechanism.

Figure 1:
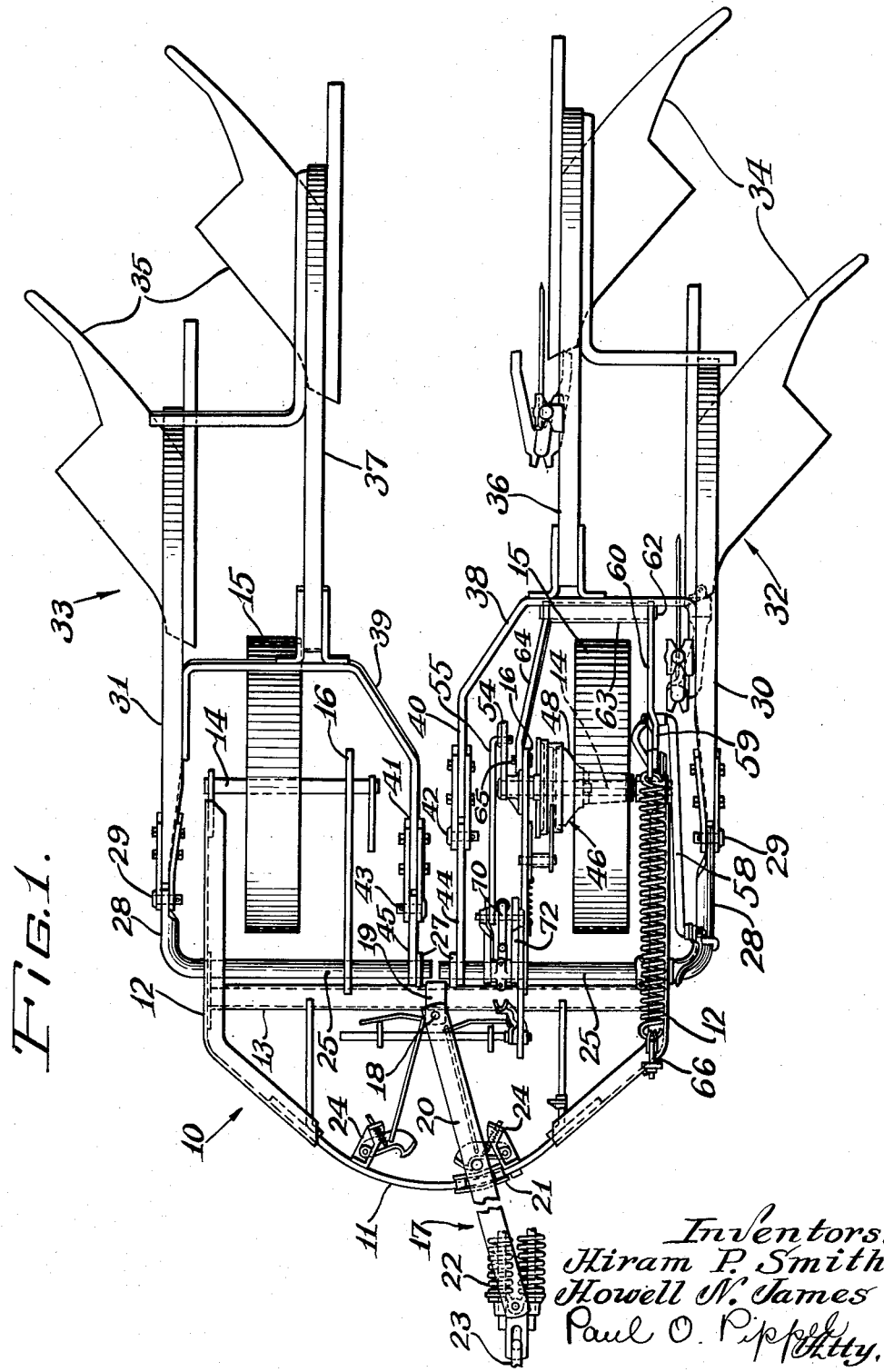
Fig. 1 is a plan view of a two-way plow, with parts removed for clarity, incorporating the features of this invention.

Referring particularly to the drawings, it will be observed that the numeral 10 designates generally a hitch frame comprising a U-shaped member having a curved forwardly extending bight portion 11 and rearwardly-extending laterally spaced arms 12 and braced by a cross piece in the form of a pipe 13, which extends transversely between the arms 12, and the rear ends of these arms are apertured to provide bearing supports respectively for the outer ends of shafts 14 upon which are mounted ground-engaging wheels 15. The inner end of each shaft 14 is rotatably carried at the end of a rearwardly extending strap 16, the forward end of which is secured as by welding to the cross piece 13.

The hitch frame 10 is adapted for connection to a tractor or other propelling vehicle by means of a draft bar 17, the rear end of which is pivotally mounted upon a pin 18 carried in a lug 19 fixed to the brace 13 centrally thereof. The draft bar 17 comprises vertically spaced members 20 which straddle the bight portion 11 of the U-shaped frame member, and a guide 21 connects the draft bar to the bight portion 11 for lateral swinging of the draft bar upon the pivot of the pin 18. The forward end of the draft bar is connected by a cushion spring hitch 22 and a clevis 23 to a tractor or other vehicle. The draft bar 17 is capable of swinging laterally to shift the position of the hitch frame with respect to the tractor, depending upon which plowing unit is in operation, and latch means 24 which form no part of this invention are utilized for securing the draft bar in the desired position upon the hitch frame for reasons well understood by those skilled in the art.

Also mounted upon the hitch frame 10 and extending transversely thereof are a pair of axially aligned rock shafts 25. The outer ends of these shafts are mounted in bearings carried in brackets 26 secured to and depending from the arms 12 for rocking movement therein. The inner ends of each shaft 25 are rotatably supported in lugs 27 secured to and extending rearwardly and downwardly from the brace 13. The outer end of each shaft 25 is bent rearwardly and downwardly as indicated in Fig. 2 to provide a rock arm 28, each of which is provided at its end with a pin 29 extending transversely, and upon which is pivoted the forward end of horizontally and longitudinally extending beams 30 and 31, forming a part of the supporting structure of a pair of laterally spaced, vertically lifted alternately operating plowing units 32 and 33 carrying, respectively, left and righthand plow bottoms 34 and 35. It may be understood that since each of the units 32 and 33 is a substantial duplicate of the other with the exception that they are right and left-hand units, a description of one will suffice for both. Laterally spaced inwardly from beams 30 and 31 are beams 36 and 37 connected respectively to beams 30 and 31 by frame members 38 and 39 having forwardly extending arms 40 and 41 pivotally connected respectively by pins 42 and 43 to rock arms 44 and 45 secured adjacent the inner ends of the transverse axially aligned shafts 25.

At this point it should be observed that by virtue of the pivotal connections upon pins 42 and 43 of the forward ends of the beams 30 and 31 and of the similar pivotal connections of the arms 40 and 41 to rock arms 44 and 45, the plow units 32 and 33 when in the operating position shown for the left-hand unit in Fig. 2, are capable of free floating movement in a generally vertical direction to permit the plow bottoms to seek their proper depth in the soil. Furthermore it should be observed that by virtue of the pivotal connection of the clevis 23 with the drawbar, not shown, of the propelling vehicle, the hitch frame likewise is capable of both lateral and vertical swinging movement relative to the tractor to cause the implement to follow the path taken thereby and to adapt itself to the contour of the soil. In addition to the swinging movement of the hitch frame 10, the plowing units 32 and 33 are likewise capable of their own independent swinging movement vertically with respect to the hitch frame as well as the propelling vehicle to accommodate itself to the plowing conditions prevailing.

As pointed out before, the transport position of the inoperative plowing unit has in the past placed the plow bottoms of that unit so near to the ground that there has been considerable danger of engagement of these inoperative plow bottoms with the ground and with obstructions. The plowing units 32 and 33 are alternately operable by separate lifting mechanism associated with and deriving power from each of the wheels 15 of the hitch frame. For the sake of clarity only of these lifting mechanisms is shown and is designated by the numeral 46 as associated with the left-hand wheel 15. The lifting unit associated with the right-hand wheel 15 is not shown since it is a substantial duplicate of the lifting mechanism 46 for the left-hand unit and a description of one and lifting linkage for connection to one of the units will suffice.

The lifting unit 46, it may be understood, is a conventional half-revolution clutch type of wheel lift such as is well known in the art and is similar to that described in U. S. Patent No. 1,755,819 issued to W. S. Graham. It may be noted that an intermittently driven plate 47 mounted on the wheel shaft 14 is normally held out of driving engagement with a constantly rotating member 48 which revolves with the wheel 15, by means of a roller 49 carried upon a lever 50 pivoted upon the frame. The lever 50 is biased to a position with the roller 49 in one of a pair of oppositely disposed notches 51 in the plate 47 by means of a spring 52 anchored to one end of the lever and to the hitch frame. The lever 50 is rocked to release the roller 49 from the notch 51 in which it is seated and to permit the plate 47 to rotate with the wheel by a rope 53 which extends forwardly to a position within reach of the operator of the propelling vehicle. The plate 47 is mounted upon the shaft 14 which has secured to its end a crank 54 connected by link 55 to the shaft 25 by mechanism to be described hereinafter. Upon each half-revolution of the plate 47 and turning of the crank 54, shaft 25 is rocked to swing the arms 28 as well as arms 44 and 45 in a generally vertical plane from a position such as indicated for the left-hand plowing unit in Fig. 1 to a substantially vertical position as indicated by forwardmost dotted lines for the right-hand unit in Fig. 2. This lifts the front end of the tool beam 30 or 31 and moves it upwardly and forwardly to its transport position. By virtue of this lifting of the front end of the plowing unit the plow bottoms of the operating unit are pitched upwardly to assist them in getting out of the ground. However, in order to lift the unit to a transport position with the entire unit elevated well above the surface of the ground, additional lifting mechanism is provided, now to be described.

Also affixed to the shaft 25 adjacent the arm 28 is an upwardly extending arm 57 which is pivotally connected by a link 58 with a lug 59 secured to a lever or arm 60 pivotally mounted upon an arm 61 secured to the end of the arm 12 adjacent wheel shaft 14. In the working position of the left-hand plowing unit, as indicated in Fig. 2, it will be noted that the pair of longitudinally spaced arms 28 and 60 are generally parallel and that the end of arm 60 extends well below the lower face of the beam 30. The end of the arm 60 supports one end of a shaft 62 surrounded by a roller in the form of a sleeve 63 and the other end of the shaft is carried by a lever arm 64 which is pivotally mounted upon a pin 65 carried by strap 16. Since in the operating position of the plowing unit the roller 63 extends well below and vertically spaced from the lower edge of the beam 30, the operating unit is capable of free vertical floating movement relative to the hitch frame and the propelling vehicle. Furthermore, during the first part of the lifting operation involving upward swinging of the arm 28 upon rocking shaft 25, the front part of the beam 30 tilts upwardly to assist in removing the tools from the ground. As the arm 28 swings upwardly to lift the front end of the beam the lever arm 60, through its connection by way of link 58 with shaft 25, likewise swings upwardly until the roller 63 comes into contact with the lower edge of the beam 30 whereupon it moves therealong during lifting of the plowing unit and provides lift for the rear end of the plowing unit as well as the front end so that the plowing unit remains substantially level between operating and transport positions. Lifting is assisted by a helper spring 65 connected to the lug 59 and to a bracket 66 secured to the hitch frame.

Depth adjustment of the plowing unit in operating position is accomplished by the provision of a crank 67 mounted in a swivel 68 carried at the front end of link 55. Link 55 is pivoted at 69 to an arm 70 which is pivotally mounted on shaft 25. Crank 67 is threaded for reception in another swivel 71 pivotally mounted at 72 on the end of an arm 73 fixed to shaft 25. Operation of the crank 67 varies the distance between pivots 69 and 72 to raise and lower pivot 29. The entire unit consisting of crank 67 and arms 70 and 73 moves about the axis of shaft 25 upon raising the associated plowing unit to transport position.

When the arm 28 has been raised to the upright position indicated in dotted lines in Fig. 2, the crank 67 and its associated arms 70 and 73 have moved about the axis of shaft 25. In this position operation of crank 67 has substantially no effect on the height of the hitch point or pivot 29 above the ground, so that the inoperative unit always returns to substantially the same elevation above the ground regardless of the spacing of pivots 69 and 72 and the depth of operation of the plows.

The operation of the two-way plow of this invention should be clearly understood from the foregoing description. It should be further understood that the invention has been described in its preferred embodiment and that modifications may be made therein without departing from the spirit of the invention or the scope of the appended claims.

What is claimed is:

1. A two-way plow of the trailing type comprising a wheel-supported hitch frame having means thereon for pivotal connection to a draft source to accommodate lateral and vertical movement of the hitch frame relative to the draft source, laterally spaced rock arms mounted on the hitch frame for swinging movement in vertical planes, said arms extending substantially horizontally rearwardly from the hitch frame, a pair of laterally spaced alternately operable plowing units including longitudinally extending tool-supporting beams pivotally connected at their forward ends to the free end of the respective of said rock arms, said arms being substantially horizontal and said units being freely pivotable relative thereto in the operating position of the respective units, power lift means carried by the hitch frame and connected to each said rock arm for effecting independent rocking thereof upwardly in a vertical plane from a substantially horizontal operating position to a vertical position in raising the tool to transport, and a connection between said lift means and the tool beam medially of its ends, said connection being operative to lift the rear end of the tool beam after a predetermined upward movement of the front end thereof.

2. In a two-way plow, a hitch frame having means thereon for connection to a draft source to be drawn thereby in trailing relation, a pair of wheels supporting the hitch frame, a pair of transversely extending axially aligned rock shafts mounted on the hitch frame, independently operable lifting mechanism associated with each said wheel and powered therefrom, an operating connection between the respective of said lifting mechanisms and said shafts for independently rocking the latter, a rearwardly extending rock arm affixed to each said shaft for vertical swinging in response to rocking of the shaft, a longitudinally extending plow beam pivotally connected at its forward end to each said arm in draft receiving relation to accommodate free floating movement of the tool-carrying beam about said pivotal connection in the operating position thereof, a second arm pivotally mounted on the hitch frame longitudinally spaced from said rock arm and operatively connected to the associated rock arm for vertical movement therewith, said second arm having an implement-engaging portion extending below the plow beam in the operating position thereof to accommodate floating movement of the plow and engageable with the under surface of the beam after a predetermined upward movement of said rock shaft to lift the entire beam for transport upon the wheel supported hitch frame.

3. In a two-way plow, a hitch frame having means thereon for connection to a draft source to be drawn thereby in trailing relation, a pair of wheels supporting the hitch frame, longitudinally spaced pairs of laterally spaced arms rockably mounted on the hitch frame for generally vertical swinging movement, each arm of the rearmost pair having a transverse member projecting laterally from its free end, a longitudinally extending plow beam having a forwardly projecting portion extending over said transverse member and pivotally connected at its forward end to the associated arm of the forwardmost pair, independently operable lift mechanism associated with each said wheel and powered therefrom, a power transmitting connection between each lift mechanism and the associated forwardmost rock arm for rocking the latter, and an operating connection between said arm and the associated rearmost arm for rocking the latter, the transverse member on said rearmost arm being movable from a position spaced vertically below the associated plow beam to accommodate free vertical swinging of the latter about its pivot on the forwardmost arm when the plow bottoms are in operating position, to a position in engagement with said beam during operation of said lift mechanism to rock said arms.

4. In a two-way plow including laterally spaced alternately operating plowing units, a hitch frame having means thereon for connection to a draft source to be drawn thereby, a supporting wheel carried by the frame adjacent each unit, a pair of longitudinally spaced generally parallel arms associated with each said unit pivotally mounted on said hitch frame for generally vertical swinging movement and having their free ends extending rearwardly therefrom, each said unit comprising a tool support having a longitudinally extending beam portion pivotally connected at its forward end to the associated forwardmost of said arms in draft receiving relation for vertical swinging movement relative thereto, independently operable lift mechanisms powered by said wheels, a power transmitting connection from each said lift mechanism to the associated forwardmost of said arms for vertically swinging the latter to raise and lower the front end of the tool beam, and a transverse member carried by the rearmost arm of each said pair arranged to engage the under surface of the plow beam medially thereof during operation of the associated lift mechanism, said transverse member being spaced vertically below said beam when the plow unit is in operation to accommodate free floating movement thereof about its connection to said forwardmost arm.

5. In a two-way plow including laterally spaced alternately operating plowing units, a hitch frame having means thereon for connection to a draft source to be drawn thereby, a supporting wheel carried by the frame adjacent each unit, a pair of longitudinally spaced generally parallel arms associated with each said unit pivotally mounted on said hitch frame for generally vertical swinging movement and having their free ends extending rearwardly therefrom, each said unit comprising a tool support having a longitudinally extending beam portion pivotally connected at its forward end to the associated forwardmost of said arms in draft receiving relation for vertical swinging movement relative thereto, independently operable lift mechanisms carried by the hitch frame for each said plowing unit to effect alternate operation thereof, a power transmitting connection from each said lift mechanism to the associated forwardmost of said arms for vertically swinging the latter to raise and lower the front end of the tool beam, and a transverse member carried by the rearmost arm of each said pair arranged to engage the under surface of the plow beam medially thereof during operation of the associated lift mechanism, said transverse member being spaced vertically below said beam when the plow unit is in operation to accommodate free floating movement thereof about its connection to said forwardmost arm.

6. In a trail-behind plow including a wheel-supported hitch frame, a longitudinally extending tool-carrying beam and lifting mechanism powered by said wheels for raising and lowering the beam, a transverse rock shaft on the frame, a rock arm fixed to the shaft with its free end extending rearwardly therefrom, pivot means connecting the forward end of said beam to the end of said arm for vertical swinging movement about a transverse axis, and means swingable with said arm about the axis of the rock shaft for adjusting the vertical position of said pivot means and therefore the operating depth of the plow comprising a pivot arm loose on said shaft, a member adjustable in length connecting the ends of said pivot arm and said rock arm and a lifting connection between said lift mechanism and said pivot arm for rocking the latter, the rock arm and said member as a unit, said rock arm being swingable to a substantially vertical position in raising the plow to transport.

7. In a trail-behind plow including a wheel-supported hitch frame, a longitudinally extending tool-carrying beam, and lifting mechanism powered by said wheels for raising and lowering the beam, a rock arm mounted on the frame on a transverse axis and having its free end extending rearwardly, pivot means connecting the forward end of said beam to the end of said arm for free floating movement thereof about said pivot in the operating position of the plow, and means for adjusting the operating depth of the tools while maintaining a substantially constant transport height thereof comprising a pivot arm on the frame adjacent said rock arm, an adjustable member connecting said arms to vary the relative angular positions thereof, and a lifting connection between said lift mechanism and said pivot arm for pivoting the latter and the rock arm as a unit, said rock arm being swingable to a substantially vertical position when the plow is raised to transport.

8. In a trail-behind plow including a wheel-supported hitch frame, a longitudinally extending tool-carrying beam, and lifting mechanism powered by said wheels for raising and lowering the beam, a rock arm mounted on the frame on a transverse axis and having its free end extending rearwardly, pivot means connecting the forward end of said beam to the end of said arm for free floating movement thereof about said pivot in the operating position of the plow, and means for adjusting the operating depth of the tools while maintaining a substantially constant transport height thereof comprising a pivot arm on the frame adjacent said rock arm, an adjustable member connecting said arms to vary the relative angular positions thereof, a lifting connection between said lift mechanism and said pivot arm for pivoting the latter and the rock arm as a unit, said rock arm being swingable to a substantially vertical position when the plow is raised to transport, and means operable after a predetermined upward swinging of the rock arm to lift the rear end of the tool beam.

References Cited in the file of this patent

UNITED STATES PATENTS

| Number | Name | Date |
|---|---|---|
| 1,420,108 | Kinney | June 20, 1922 |
| 2,619,016 | Dooley | Nov. 25, 1952 |